M. H. STEWART.
TIRE TOOL.
APPLICATION FILED NOV. 20, 1914.

1,183,690.

Patented May 16, 1916.
2 SHEETS—SHEET 1.

WITNESSES
O. B. Baenziger.
M. E. Broussard.

INVENTOR
Milton H. Stewart
BY
B. P. Wheeler
HIS ATTORNEY.

M. H. STEWART.
TIRE TOOL.
APPLICATION FILED NOV. 20, 1914.

1,183,690.

Patented May 16, 1916.
2 SHEETS—SHEET 2.

WITNESSES
O. B. Baenziger
M. E. Broesamle

INVENTOR
Milton H. Stewart
BY
B. T. Wheeler
HIS ATTORNEY.

UNITED STATES PATENT OFFICE.

MILTON H. STEWART, OF DETROIT, MICHIGAN.

TIRE-TOOL.

1,183,690.  Specification of Letters Patent.  Patented May 16, 1916.

Application filed November 20, 1914. Serial No. 873,155.

*To all whom it may concern:*

Be it known that I, MILTON H. STEWART, a citizen of the United States, residing at Detroit, in the county of Wayne, State of Michigan, have invented certain new and useful Improvements in Tire-Tools; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a device especially designed and adapted for adjusting tire casings, of the "clencher" type, upon the rims of vehicle wheels, and consists in the novel construction and arrangement as hereinafter fully set forth and claimed.

The invention has for its object the provision of a simple and efficient tool for use in the operations of applying tire casings to the rims of wheels and for removing them therefrom, by which the manual exertion usually attending such work is minimized and the accomplishment of the task is facilitated in a safe and rapid manner.

Further advantages in the use of the invention are attained by the novel two-piece construction of the tool, in which the parts are made detachable and adapted for coöperative use in manipulating the tire for positioning the tool thereon preparatory to the operation of removal or replacement, as well as providing a fulcrum bearing with the hub of the wheel or a bearing support with the ground, where the hub is not accessible, as in wire wheels, to afford a suitable anchorage for the tool and enable the completion of the operation with comparative ease by imparting a rotative movement to the wheel.

Figure 4:
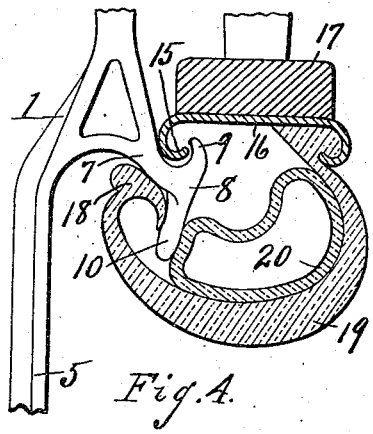
Figure 5:
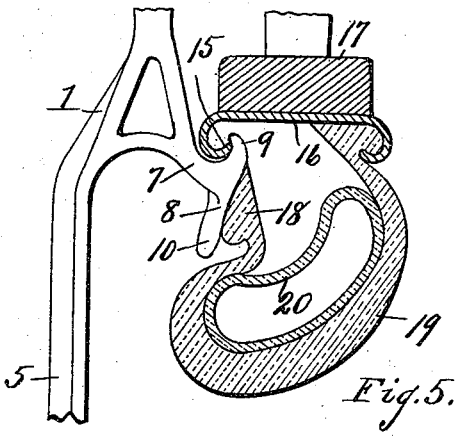
Figure 1:
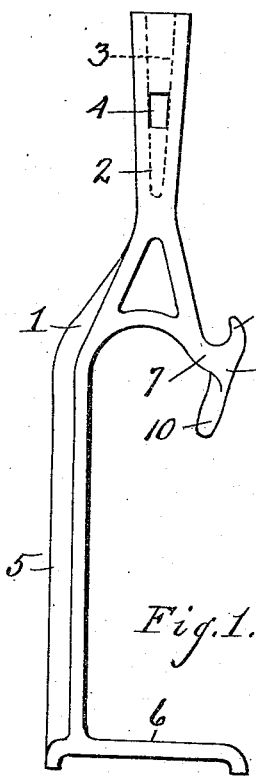
Figure 2:
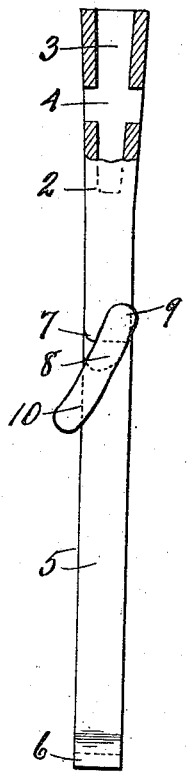
Figure 3:
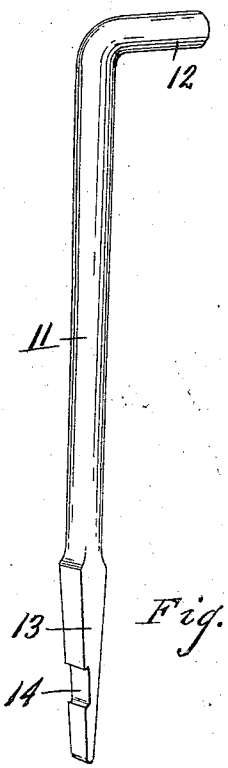
Figure 6:
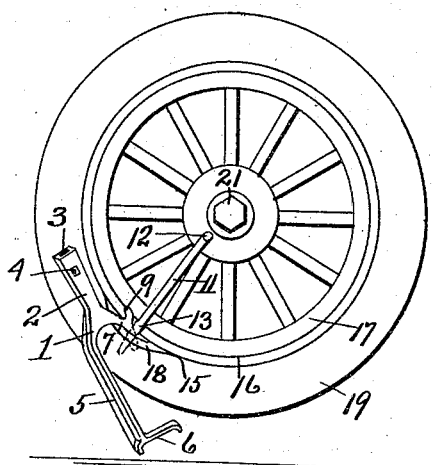
Figure 7:
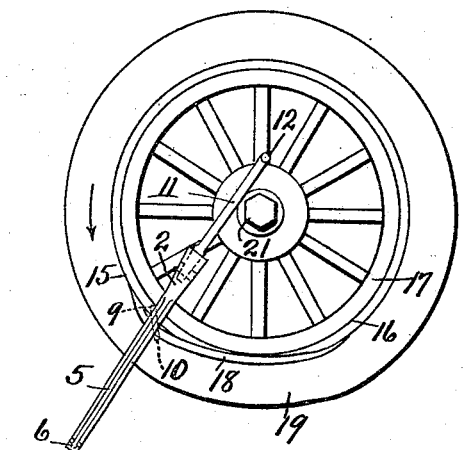
Figure 8:
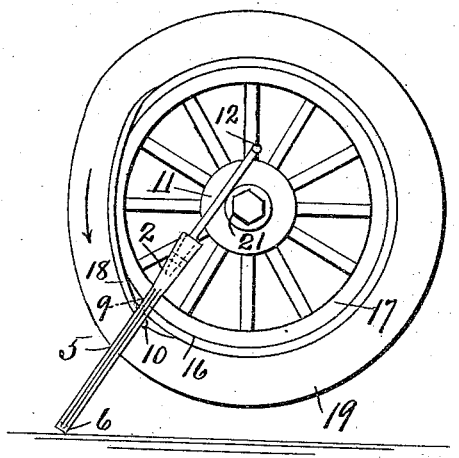
Figure 9:
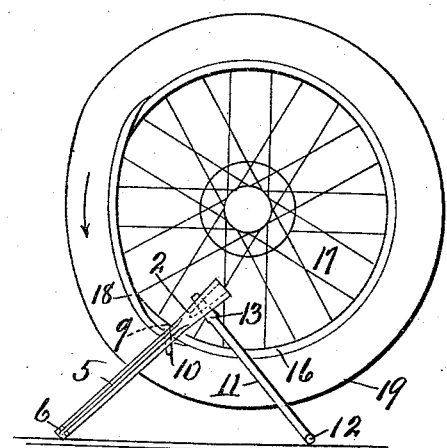

The preferred embodiment of the present invention is comprised in the construction illustrated in the accompanying drawings, in which:

Figure 1 is a side elevation of the body portion of the tool. Fig. 2 is an edge elevation of Fig. 1, having a portion of the shank or upper end broken away to show the socket and transverse aperture formed therein. Fig. 3 is a side elevation of a detachable extension for the body portion, adapted to serve also as an auxiliary tool. Fig. 4 is a transverse sectional view through a tire and rim of the clencher type showing a portion of the body of the tool having a hooked tongue inserted to engage the bead of the tire and the flange of the rim, in position for removing the tire therefrom. Fig. 5 is a transverse sectional view similar to Fig. 4, but showing the hooked tongue inserted between the bead and rim in position for replacing the tire upon the rim. Fig. 6 is a side elevation of a wheel and tire showing the detachable extension applied as an auxiliary tool for raising the bead of the tire to facilitate the insertion of the hooked tongue of the body of the tool into position in engagement with the bead of the tire and rim of the wheel preparatory to removing the tire therefrom. Fig. 7 is a side elevation of a wheel and tire showing the tool in position thereon for removing the tire, and the tire partially removed, with the body of the tool engaging the ground at its lower end, the detachable extension inserted at its upper end and engaged with the hub of the wheel to anchor the tool against rotary movement with the wheel. Fig. 8 is a side elevation of a wheel and tire showing the tool in the same position as in Fig. 7 with the exception that the hooked tongue is engaged with the outer surface of the bead in position for replacing the tire, the greater portion of which is shown upon the rim. Fig. 9 is a side elevation of a wire wheel and tire in which the body of the tool is shown in substantially the same position on the wheel as in Fig. 8, but as there is no hub projection on this type of wheel for engagement with the detachable extension, said member is inserted at one end into a transverse aperture in the shank of the tool and engaged at its opposite end with the ground in the manner of a leg or brace to anchor the tool against movement when rotating the wheel to remove or replace the tire.

Referring to the drawings by the characters of reference indicating the several parts, 1 designates the body of the tool which is preferably formed by casting, and which comprises a shank 2, having in its upper end a tapered socket 3 and a transverse aperture 4 extending therethrough, both of which may be formed by coring. Extending from the lower end of the shank 2 and off-set therewith upon one side is an arm or leg 5 which terminates at its lower end in a laterally extending foot 6 adapted to form a bearing for engagement with the ground or other fixed support. The opposite side of the shank 2 is provided with a laterally diverging extension 7 terminating in a hooked tongue 8 which is positioned thereon so as to stand at an incline to the plane of the body of the tool with the hooked portion 9 extending upwardly and inwardly toward the shank 2 and with the tongue portion 10 depending at an incline to the offset extension or leg 5 of said shank. (See Figs. 1 and 2).

The detachable extension 11 for the body of the tool, as shown in Fig. 3, is provided at one end with a right-angled bend forming a lateral projection 12 which serves as a handle and also affords a bearing surface in the form of a foot for engagement with the ground when employed in a certain position with the body of the tool, and the opposite end of said member is squared and tapered as at 13 to fit into the tapered socket 3 and also into the aperture 4 of the shank, as shown in Figs. 8 and 9. A notch 14 is formed in one side of the tapered end 13 to serve as a detent for engagement with the flange 15 of the rim 16 of the wheel 17 when the tapered end is inserted between the bead 18 of the tire 19 and said flange 15, for the purpose of raising the bead to permit the insertion of the hooked tongue of the tool, as shown in Fig. 1. By this arrangement the detachable extension 11 is made to serve as an auxiliary tool for use in connection with the body of the tool in the initial operation of applying the tool to the rim and tire, as well as providing additional leverage and anchorage for the body of the tool to facilitate the work in the further operation of removing or replacing the tire, as will be more readily understood from the following description of the operation of the device.

To remove a tire the wheel is first jacked up to clear the ground in the usual way, the inner air tube 20 being deflated, the operator inserts the tapered end of the auxiliary tool 11 between the flange 15 of the rim 16 and the bead 18 of the tire 19 so as to engage the notch 14 of said tool with said flange, to form a fulcrum bearing upon which to swing the tool radially of the wheel, as shown in Fig. 6, whereby a portion of the bead will be raised and deflected out of the plane of the rim, leaving an opening between said bead and flange. The hooked tongue 8 of the body of the tool is then entered in the opening between the bead and flange with the tongue portion 10 engaging the back face of the tapered end 13 of the auxiliary tool, as shown in Fig. 6. In this position the inclination of the hooked tongue with respect to the body of the tool enables said tongue to be conveniently inserted while the off-setting of the leg 5 affords clearance between the tool and tire to permit of a turning and swinging movement of said tool to further engage the hooked portion 9 of said tongue with the inner face of the flange of the rim, and to finally position the tool radially of the wheel, as shown in Figs. 4 and 7. When the tongue and body of the tool are attached and positioned in this manner, the auxiliary tool may be disengaged from the bead and rim by withdrawing it, and may then be inserted at its tapered end into the tapered socket 3 in the shank 2 of the tool where it may be held by hand to steady the body of the tool with the foot 6 engaging the ground, or it may be securely retained in position by placing the extension formed by the auxiliary tool in contact with the hub 21 of the wheel, as shown in Figs. 7 and 8.

Where the hub of the wheel does not project sufficiently to afford a suitable bearing as is the case with certain makes of automobile rear wheels, and wheels having wire spokes, the extension or auxiliary tool may be inserted at its tapered end into the transverse aperture 4 of the shank and placed with its handle end 12 in contact with the ground in the manner of a brace to support the body of the tool upon the ground in substantially the same position as though the extension were engaged with the hub of the wheel. (See Fig. 9). The device thus attached and supported is in position for the removal of the tire, which may now be accomplished by rotating the wheel in a direction to force the lower end of the tool into contact with the ground, as indicated by arrows in Figs. 7 and 9, so as to anchor it against rotation with the wheel. This will cause the hook 9 of the hooked tongue 8 to ride upon the perimeter of the flange of the rim and the depending inclined tongue 10 to follow in engagement with the inner face of the bead of the tire in the manner of a plow, raising said bead upon its inner inclined face and forcing it outwardly from the flange of the rim progressively as the wheel is rotated, (see Fig. 4).

When the bead at the outer side of the tire has been removed and it is desired to dismount the tire case from the rim, the bead at the inner side may be removed by sliding it over to the outer flange of the rim, when it may be readily engaged by the auxiliary tool and forced over the flange in the usual manner.

To mount or replace a tire casing upon the rim, the tool is attached, supported and manipulated in substantially the same manner as described for removing the tire, with the exception that the outer face of the inclined depending tongue is engaged with the outer face of the bead (see Fig. 5), which is forced thereby over the flange of the rim and into interlocking position therein by a sliding contact with the inclined face of said tongue as the wheel is rotated in the same direction as before described and as shown in Fig. 8.

It will be apparent from the foregoing that a device embodying these features of construction is adaptable for use upon tires and wheels of various sizes as well as upon wheels of the hubless type; that it will be comparatively light, strong and inexpensive to make and may be conveniently carried in the ordinary tool kit; that the single hooked tongue member will serve both purposes in removing and replacing the tire without necessitating the shifting or readjustment of the position of the tool, and that by reason of the detachable two-piece construction the tool may be reduced in length and the two parts used coöperatively in a convenient manner in gaining access to manipulate the tire and avoid interference with mud guards or other projections about the wheels in the initial operation of positioning the tool; as well as being extensible to afford a suitable bearing support with the ground or hub of the wheel to anchor the tool in position for the final operation of removing or replacing the tire. These features of utility contribute materially to lessen the time and labor usually involved, and render the accomplishment of such operations a matter of comparative ease.

Having thus fully set forth my invention, what I claim as new, and desire to secure by Letters Patent, is:

A tire-removing and replacing tool consisting of a shank having an offset branch extending in substantially parallel relation with the axis thereof, a ground-engaging foot extending inwardly across the axis of the shank from the lower end of such branch, a second branch extending from the lower end of the shank proper and oppositely to the first named branch, and a lug carried by the end of the said second branch and arranged diagonally with respect to the axis of the shank, the upper end of said lug being curved inwardly toward the shank and the lower end of said lug being tapered from front to rear, the outer surface of the lug being concaved.

In testimony whereof, I sign this specification in the presence of two witnesses.

MILTON H. STEWART.

Witnesses:
B. F. WHEELER,
H. C. THOMAS.

Copies of this patent may be obtained for five cents each, by addressing the "Commissioner of Patents, Washington, D. C."